US009042631B2

(12) United States Patent
Padfield et al.

(10) Patent No.: US 9,042,631 B2
(45) Date of Patent: May 26, 2015

(54) METHOD AND SYSTEMS FOR CELL-LEVEL FISH DOT COUNTING

(71) Applicant: General Electric Company, Schenectady, NY (US)

(72) Inventors: Dirk Ryan Padfield, Albany, NY (US); Anitti Eljas Seppo, Altamont, NY (US); Yousef Ahmed Al-Kofahi, Slingerlands, NY (US)

(73) Assignee: General Electric Company, Niskayuna, NY (US)

( * ) Notice: Subject to any disclaimer, the term of this patent is extended or adjusted under 35 U.S.C. 154(b) by 115 days.

(21) Appl. No.: 13/849,585

(22) Filed: Mar. 25, 2013

(65) Prior Publication Data

US 2014/0205173 A1    Jul. 24, 2014

Related U.S. Application Data

(60) Provisional application No. 61/756,025, filed on Jan. 24, 2013.

(51) Int. Cl.
*G06K 9/00* (2006.01)

(52) U.S. Cl.
CPC .................................. *G06K 9/00127* (2013.01)

(58) Field of Classification Search
None
See application file for complete search history.

(56) References Cited

U.S. PATENT DOCUMENTS

| 5,523,207 A * | 6/1996 | Kamentsky et al. ......... 435/6.12 |
| 8,577,093 B2 * | 11/2013 | Friedman et al. ............. 382/115 |
| 2008/0212172 A1 | 9/2008 | Zhu et al. |
| 2009/0123054 A1 | 5/2009 | Bodmer et al. |
| 2010/0290692 A1 | 11/2010 | Macaulay et al. |
| 2011/0286654 A1 * | 11/2011 | Krishnan ...................... 382/133 |
| 2012/0076349 A1 * | 3/2012 | Manri et al. .................. 382/100 |
| 2012/0129165 A1 | 5/2012 | Raj et al. |
| 2012/0163681 A1 | 6/2012 | Lohse et al. |
| 2013/0044951 A1 * | 2/2013 | Cherng et al. ................ 382/170 |

FOREIGN PATENT DOCUMENTS

WO    WO0120044 A2    3/2001

OTHER PUBLICATIONS

Raimondo et al, "Automated Evaluation of Her-2/neu Status in Breast Tissue From Fluorescent In Situ Hybridization Images", IEEE Transaction on Image Processing, Piscataway, New Jersey, US, vol. 14, No. 9, Sep. 1, 2005, pp. 1288-1299.*

Raimondo, Automated Evaluation of Her-2/neu Status in Breast Tissue From Fluorescent In Situ Hybridization Images, Sep. 2005, IEEE Transactions on Image Processing, vol. 14, No. 9, pp. 1288-1299.*

(Continued)

*Primary Examiner* — Jayesh A Patel
*Assistant Examiner* — Mai Tran
(74) *Attorney, Agent, or Firm* — Eileen B. Gallagher

(57) ABSTRACT

The invention relates to a computer implemented method and systems for cell level fish dot counting. FISH (fluorescence in situ hybridization) dot counting is the process of enumerating chromosomal abnormalities in the cells which can be used in areas of diagnosis and cancer research. The method comprises in part overlaying images of a biological sample comprising a nuclear counterstain mask and a FISH binary mask. The FISH binary mask is extracted using a multi-level extended h-maxima or h-minima.

24 Claims, 5 Drawing Sheets

(56) References Cited

OTHER PUBLICATIONS

Jung, Segmenting Clustered Nuclei Using H-minima Transform-based Marker Extraction and Contour Parameterization, Oct. 2010, IEEE Transactions on Biomedical Engineering, vol. 57, No. 10, pp. 2600-2604.*

Raimondo, Automated Evaluation of Her-2/neu Status in Breast Tissue From Fluorescent in Situ Hybridization Images, Sep. 2005, IEEE Transactions of Image Processing, vol. 14, No. 9, pp. 1288-1299.*

Gavrielides M A et al, "Automated Evaluation of Her-2/neu Status in Breast Tissue From Fluorescent in Situ Hybridization Images", IEEE Transactions on Image Processing, Piscataway, New Jersey, US, vol. 14, No. 9, Sep. 1, 2005, pp. 1288-1299.

Chanho Jung et al, "Segmenting Clustered Nuclei Using H-minima Transform-Based Marker Extraction and Contour Parameterization", IEEE Transactions on Biomedical Engineering, Piscataway, New Jersey US, vol. 57, No. 10, Oct. 1, 2010 pp. 2600-2604.

Kamran Ali et al, "Medical Image Segmentation Using H-minima Transform and Region Merging Technique", Frontiers of Information Technology Dec. 19, 2011, pp. 127-132.

PCT International Search Report and Written Opinion from corresponding PCT Application No. PCT/EP2014/051077 dated Apr. 11, 2014.

Netten et al., "Fluorescent Dot Counting in Interphase Cell Nuclei", Bioimaging, vol. 4, pp. 93-106, 1996.

Ortiz de Solórzano et al., "Automated FIH Spot Counting in Interphase Nuclei: Statistical Validation and Data Correction", Cytometry, vol. 31, pp. 93-99, 1998.

Wang et al., "Fluorescence In Situ Hybridization (FISH) Signal Analysis Using Automated Generated Projection Images", Analytical Cellular Pathology, vol. 35, Issue 5, pp. 395-405, Jan. 1, 2012.

Seppo et al., "Automated Analysis of Her2 FISH Using Combined Immunofluorescence and FISH Signals", Cancer Research, vol. 72, Issue 24, Supplement 3, 2 pages, Dec. 15, 2012.

Reljin et al., "Breast Cancer Evaluation by Fluorescent Dot Detection Using Combined Mathematical Morphology and Multifractal Techniques", Diagnostic Pathology, vol. 6, 4 pages, Supplement 1, S21, 2011.

Bartlett et al., "HER2 FISH in Breast Cancer", Methods in Molecular Medicine, vol. 97, pp. 89-101, 2004.

Ram et al., "Segmentation and Classification of 3-D Spots in FISH Images", 2010 IEEE Southwest Symposium, pp. 101-104, 2010.

Raimondo et al., "Automated Evaluation of Her-2/neu Status in Breast Tissue From Fluorescent in Situ Hybridization Images", IEEE Transactions on Image Processing, vol. 14, No. 9, pp. 1288-1299, Sep. 2005.

Sun et al., "Autofocusing in Computer Microscopy: Selecting the Optimal Foxus Algorithm", Microscopy Research and Technique, vol. 65, pp. 139-149, 2004.

Padfield et al., "Coupled Minimum-Cot Flow Cell Tracking for High-Throughput Quantitative Analysis", Medical Image Analysis, vol. 15, pp. 650-668, 2011.

Mallat, "A Theory for Multiresolution Signal Decomposition: The Wavelet Representation", IEEE Transactions on Pattern Analysis and Machine Intelligence, vol. 11, No. 7, pp. 674-693, Jul. 1989.

Meyer, "Topographic Distance and Watershed Lines", Signal Processing, vol. 38, pp. 113-125, 1994.

* cited by examiner

A    B    C

Before　　　　　　　　　After

For *each cell i* do
    if $R_i^1 \geq T_1$ then
        if $R_i^1 \geq T_2$ and $R_i^2 \geq T_1$ then
            $Level \longrightarrow h_2$;
        else
            $Level \longrightarrow h_1$;
        end
    else
        $Level \longrightarrow h_0$
    end
end
*Fig. 5*
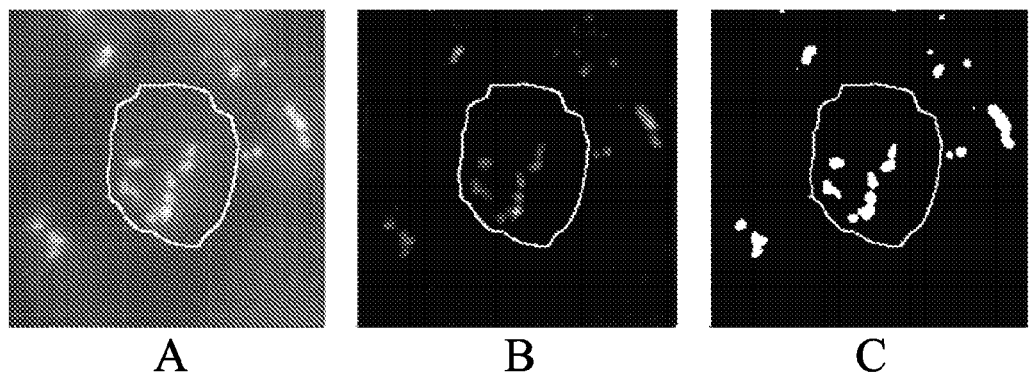
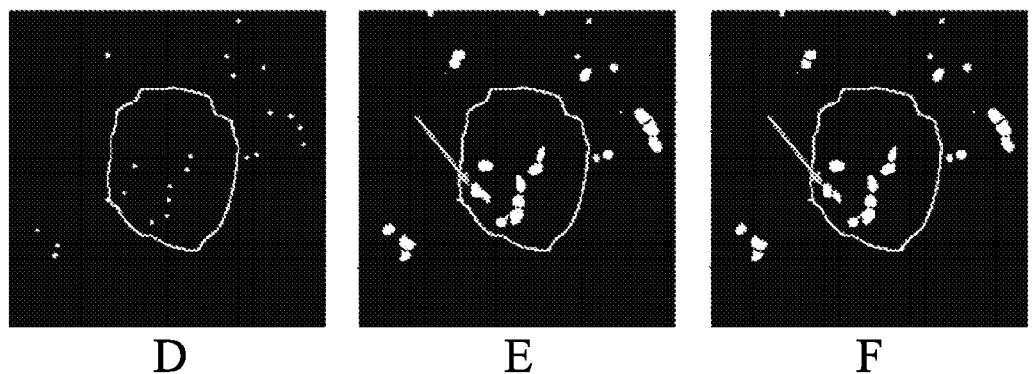
*Fig. 6*

| Counting Method | Her2 | Cep17 |
|---|---|---|
| Manual | 5 | 3 |
| Automated | 5 | 3 |

| Counting Method | Her2 | Cep17 |
|---|---|---|
| Manual | 4 | 3 |
| Automated | 4 | 3 |

| Counting Method | Her2 | Cep17 |
|---|---|---|
| Manual | 5 | 2 |
| Automated | 5 | 2 |

| Counting Method | Her2 | Cep17 |
|---|---|---|
| Manual | 6 | 3 |
| Automated | 6 | 3 |

| Counting Method | Her2 | Cep17 |
|---|---|---|
| Manual | 7 | 7 |
| Automated | 7 | 7 |

| Counting Method | Her2 | Cep17 |
|---|---|---|
| Manual | 12 | 3 |
| Automated | 11 | 3 |

| Counting Method | Her2 | Cep17 |
|---|---|---|
| Manual | 12 | 6 |
| Automated | 11 | 6 |

*Fig. 7*

METHOD AND SYSTEMS FOR CELL-LEVEL FISH DOT COUNTING

CROSS-REFERENCE TO RELATED APPLICATIONS

This application claims priority to U.S. provisional patent application No. 61/756,025 filed Jan. 24, 2013; the disclosure of which is incorporated herein by reference in its entirety.

BACKGROUND

Fluorescence in situ hybridization (FISH) dot counting is the process of enumerating chromosomal abnormalities in interphase cell nuclei. This process is widely used in many areas of biomedical research, especially in cancer diagnosis and treatment decisions. For example, breast cancer is the most common cancer for women worldwide. Human Epidermal Growth Factor Receptor 2 (HER2) gene copy number is important for breast cancer patients when determining eligibility for adjuvant targeted therapy and/or chemotherapy medications. 1 FISH testing can be used to see if the cells have extra copies of the HER2 gene: a cell having more copies of the HER2 gene is known to have more HER2 receptors, which receive signals that stimulate the growth of breast cancer cells. Using this method, target parts in the cells become visible as colored dots under a fluorescent microscope. The HER2 probes are visible as orange stained spots while probes for the Chromosome 17 centromere (CEP17), the chromosome on which the gene HER2 is located, are visible as green spots. This color-dots visualization method makes it possible to estimate the HER2 gene copy number by counting the dots in the cells. Often, dot counting needs to be approximate and therefore, performed manually. However, in addition to being subjective, manual counting of FISH dots is time-consuming and tiring.

Several researchers have proposed algorithms for automatic counting of FISH dots. For instance, a method based on mathematical morphology and inverse multi-fractal analysis has been used as well as a method based on top-hat filtering and 3-D region growing. Another approach used top-hat filtering followed by template matching to separate real signals from noise. In spite of the use of these algorithms, automatic FISH dot detection is still challenging, especially in the presence of background artifacts (FIG. 1A), dense clusters of cell nuclei and FISH dots (FIG. 1B) and/or low FISH dots contrast (see FIG. 1C). Therefore, there is a persistent need to develop automatic detection and counting algorithms that advance the state of the art and that deal with the FISH dot detection and counting challenges.

BRIEF DESCRIPTION

The invention generally relates to a computer implemented method of cell-level FISH dot counting of a biological sample. The computer, including a process, the method comprising: receiving by the process a first image of a biological sample stained with a nuclear counterstain; transforming by the processor the image into a nuclear counterstain mask by segmenting the nuclei of the biological sample based on intensity of the signal from the nuclear counterstain; receiving by the processor a second image of a biological sample stained with an hybridized in situ fluorescent probe (FISH probe); applying by the processor a multi-level extended h-maxima or h-minima to the image to extract a FISH binary mask; aligning and overlaying the nuclear counterstain mask and FISH binary mask by the processor according to the signals detected; and optionally counting by the processor the number of FISH dots inside each nucleus using local maxima and size constraints.

In another aspect, the invention provides a non-transitory computer-readable medium capable of having a computer perform the method described above.

In yet another aspect, the invention a system for cell-level FISH dot counting, the system comprising: processor; an input coupled to the processor and configured to receive image data; and memory coupled to the processor, the memory including computer-executable instructions that when executed by the processor cause the processor to execute the method described above.

DRAWINGS

These and other features, aspects, and advantages of the present invention will become better understood when the following detailed description is read with reference to the accompanying drawings in which like characters represent like parts throughout the drawings, wherein:

FIG. 5 is Algorithm 1: the rule-based algorithm for setting the best level for each cell.

FIG. 6 is illustrative of the final FISH counting step: (A) cell from Her2 FISH image with the cell contour superimposed, (B) outcome of top-hat filtering. (C) FISH (foreground) detection, (D) detected local maxima points, (E) initial dot separation where 8 out of 9 dots are detected, (F) final counting using size-based constraints results with 9 dots.

FIG. 7 is illustrative of the counting method and corresponding micrographs of selected FISH dot detection results.

DETAILED DESCRIPTION

Disclosed are methods for cell-level counting of FISH dots in 2-D fluorescence images of a biological sample. As used herein, the term "biological sample" refers to a sample obtained from a biological subject, including sample of biological tissue or fluid origin obtained in vivo or in vitro. Such samples can be, but are not limited to, body fluid (e.g., blood, blood plasma, serum, or urine), organs, tissues, fractions, cells isolated from mammals including, humans and cell organelles. Biological samples also may include sections of the biological sample including tissues (e.g., sectional portions of an organ or tissue). Biological samples may also include extracts from a biological sample. Biological samples may comprise proteins, carbohydrates or nucleic acids.

A biological sample may be of prokaryotic origin, archaeal origin, or eukaryotic origin (e.g., insects, protozoa, birds, fish, and reptiles). In some embodiments, the biological sample is mammalian (e.g., rat, mouse, cow, dog, donkey, guinea pig, or rabbit). In certain embodiments, the biological sample is of primate origin (e.g., example, chimpanzee, or human).

Figure 1:
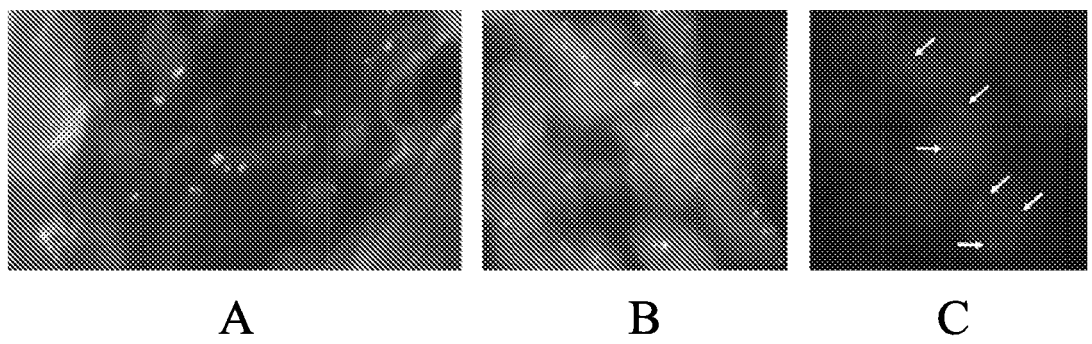
FIG. 1 is a micrograph showing examples of breast cancer images showing background artifacts: A) HER2 FISH image with noise and artifacts, B) gray scale composite image with dense nuclei and FISH dots, C) a low contrast HER2 FISH image. The white arrows point to HER2 FISH dots.
Figure 2:
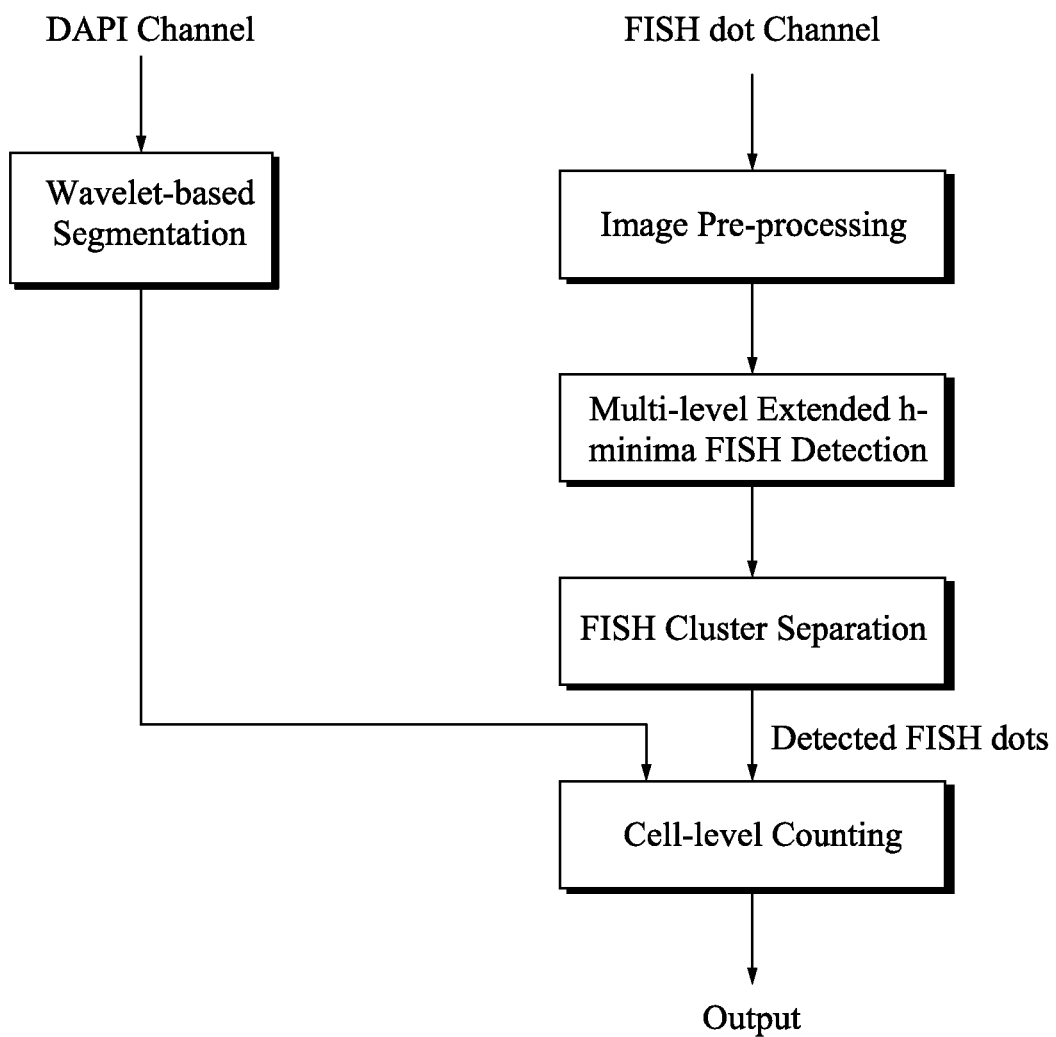
FIG. 2 is a flow chart diagram of the cell-level FISH counting algorithm.

In certain embodiments, as shown in FIG. 2, the method of counting comprises the steps of staining the biological sample with a nuclear counterstain s and acquiring images.

Nonlimiting examples of a nuclear counterstain includes blue-fluorescent counterstains such as DAPI (4',6-diamidino-2-phenylindole), as well as green, yellow, orange, or red-fluorescent counterstains such as propidium iodine, The method further comprises transforms the images into segmented images to produce a nuclear counterstain mask whereby, if for example DAPI is used, a DAPI mask is generated. In certain embodiments, the counterstain mask may be acquired using a 2-D wavelet based segmentation algorithm to delineate the cell nuclei. This is then followed by FISH dot detection and counting whereby a multi-level h-minimum transform approach may be used that accounts for the varying image contrast. This step may be preceded by, image pre-processing where median and top-hat filters are used to clean image noise (which may be referred to as denoise or denoising the image), subtract background and enhance the contrast of the FISH dots. After the multi-level h transformation, FISH dot counting may proceed where clustered FISH dots are separated using a local maxima detection-based. In certain embodiment, FISH dot size filtering based on constraints may also be used to account for large connected components of tightly-clustered dots.

To achieve accurate dot quantification results on the single-cell level, an important step is to obtain accurate segmentation of cell nuclei. As such, a 3-D stack of approximately at least 3 nuclear counterstained (for example DAPI stained) stained images may be acquired at various focal depths through the biological sample. Each stack may contain only a few in-focus slices. Therefore, in certain embodiments, the best in-focus slice is selected by computing the Brenner gradient value of each image/slice. A wavelet-based segmentation algorithm may then be applied to the selected in-focus slice.

The wavelet-based method may be advantageous for several reasons: wavelets decompose the image into both the spatial and frequency domain enabling effective scale-space analysis, the calculation of wavelets across multiple scales is fast and computationally efficient, and the number of parameters can be limited. To de-noise the images and segment the cells, an algorithm based on the shift-invariant wavelet frames transformation of the image may be used as well as the filtering of non-salient wavelet coefficients. Wavelet frames are identical to the standard wavelet transform except that the decimation operation at each level is omitted. The decomposition is represented as equations (1) and (2):

$$I_i(x,y) = \Sigma_{m,n} h(m,n) I_{i-1}(x - 2^{i-1}m, y - 2^{i-1}n) \quad (1)$$

$$W_i(x,y) = I_i(x,y) - I_{i+1}(x,y) \quad (2)$$

where $I_i$ and $W_i$ represent the approximation and detail images, respectively, at each scale, i, and h(m, n) denotes the scaling function, and m and n are x and y indices. The recursive definition in Equation 1 is initialized by setting $I_0(x,y)$ to the original discrete image.

Using the decomposition, the images may be directly de-noised in the wavelet coefficient space. Assuming that the image noise is additive, the corresponding wavelet transformation results in coefficients generated by the underlying signal $W^i$ and those that correspond to image noise $W^N$. To approximate the signal term, the image stack may be thresholded with an Amplitude-scale-invariant Bayes Estimator (ABE) using Jefreys' non-informative prior as an estimate of the significance of wavelet coefficient $W_i^I(x,y)$ at a given scale i and position (x,y) as represented in equation 3:

$$W_i^I(x,y) \approx \delta^{ABE}(W_i(x,y)) = \frac{(W_i(x,y)^2 - 3\sigma_i^2)}{W_i(x,y)} \quad (3)$$

where $\sigma\_i^2$ is the estimated noise variance at a given scale i calculated in a background patch. In order to further reduce noise, or denoise the image, and enhance objects that extend across multiple resolutions, we compute a correlation stack $C\_s(x,y)$, may be computed which is the multiplication of a subset of the de-noised wavelet coefficients corresponding to the selected scales (equation 4):

$$C_s(x,y) = \prod_{i=j_l}^{j_u} W_i^I(x,y)_+ \quad (4)$$

This wavelet-based segmentation approach may be used to segment images even in the presence of relatively low contrast-to-noise and in the presence of flat-field effects that manifest as slowly-varying backgrounds.

In addition to the nuclear counterstaining of the biological sample, nuclei segmentation, FISH staining of the biological sample may also occur at the same time or sequentially. The FISH stains can be distinguished from the nuclear counter-stain based on differences in absorption/emission wavelengths of the dyes.

FISH detection and counting step comprises three steps 1) image preprocessing and background subtraction, 2) foreground extraction, and 3) counting.

Figure 3:
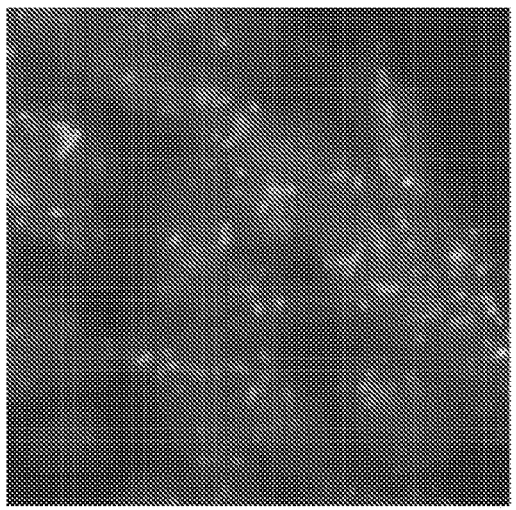
FIG. 3 is a micrograph showing results of background subtraction using top-hat filtering.
Figure 3:
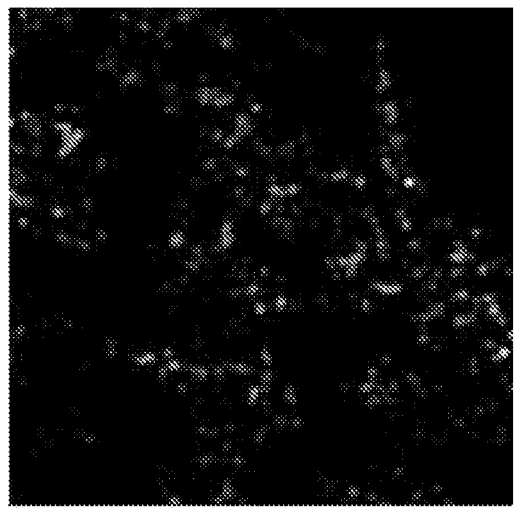
Figure 3:
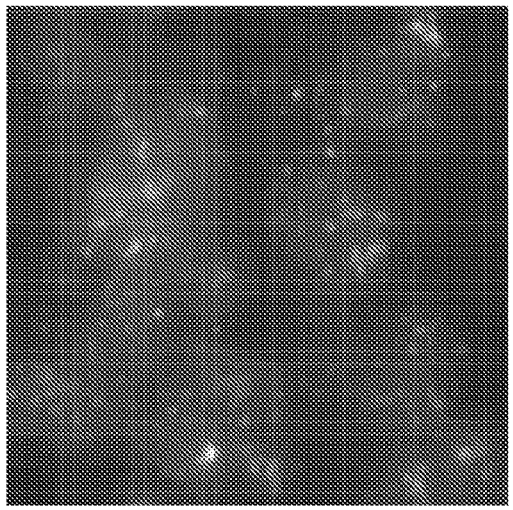
Figure 3:

In certain embodiment, image preprocessing and background subtraction is similar to the transformation of the nuclear counter-stained images. As such, a 3-D stack of approximately at least 3 FISH images and preferably at least 5, and more preferably at least 10, FISH images are acquired at various focal depths through the biological sample. Only a few of the images are in-focus. Brenner gradient values for the 3-D image stack are computed, to find the best in-focus slice, which has the maximum Brenner value. In addition to that slices, the slice before and after are extracted and a maximum 2-D projection is applied. Then, median filtering is applied on the max-projection image to reduce image noise or denoise. The last pre-processing step is background subtraction/cleaning using top-hat filtering. The top-hat filter may be used because FISH dots appear as small bright spots. It performs morphological filtering on a gray scale or binary image. It first computes the morphological opening of the image, which produces an approximate background image, where background refers to non-FISH dot signal. Then, it subtracts this background image from the original image. Mathematically, this is written as equation 5:

$$T(I) = I - (I \circ s) \quad (5)$$

Where I is the input image, s is the filter kernel and ○ represents the morphological opening operation. This results in a cleaner map of FISH dots as shown in FIG. 3. The kernel size for the top-hat filter is set to be slightly larger than the expected FISH dot size. In our work, we used a disk structuring element of radius 5 pixels.

In certain embodiments, the image preprocessing and background subtraction is followed by extracting from the image a FISH binary mask. As mentioned in the previous step, FISH dots are expected to be small bright dots. Therefore, morphological methods such as h-maxima and h-minima, which are dual operations, can assist in FISH detection. However, the straightforward application of these methods may fail when dealing with dense clusters of dots and/or images with varying contrast as will be explained later in this section.

To overcome these limitations, a FISH dot detection method using a multi-level extended h-minima transform (or h-maxima), with automatic level selection may be used. Single level extended h-minima transform extracts the regional minima of the h-minima transform. It starts by applying the h-minima transform at a level h to suppress all minima in an image whose depth is less than an intensity value h. Then it extracts the regional minima of the resulting image. If the value of h is set carefully, the h-minima transform will produce a uniform background for non-FISH dots pixels. In that case, extracting the regional minima will extract all of the non-FISH pixels in the image. Taking the inverse we get a FISH dot mask (at level h). Mathematically, this is written as equation 6:

$$F_h = 1 - E^h(\tilde{I}) \quad (6)$$

where $F_h$ is the FISH dot mask at level h, $E^h$ is the extended h-minima transform at level h, which is a binary image, and $\tilde{I}$ is the top-hat filtered FISH image.

Figure 4:
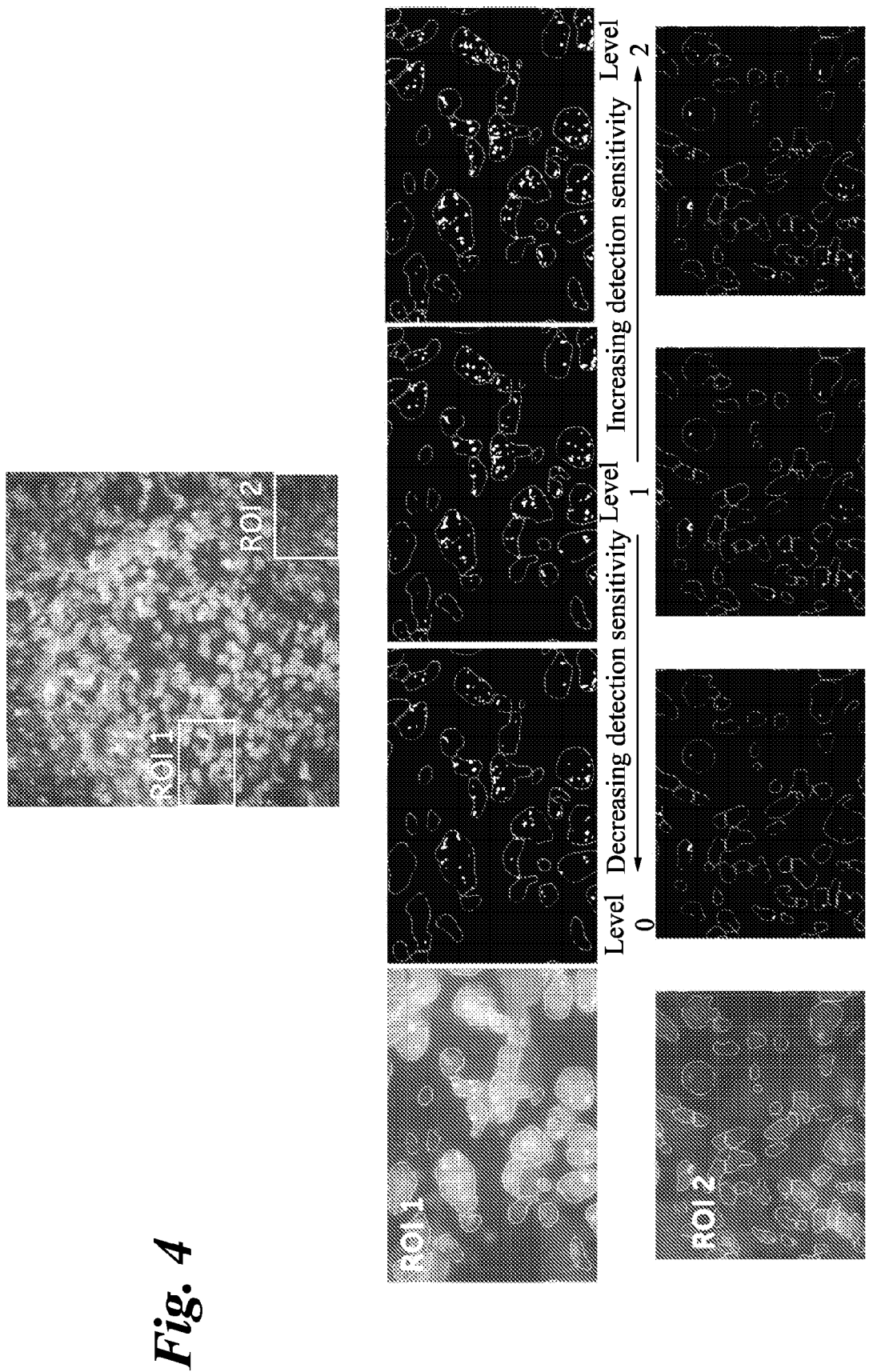
FIG. 4 is a series of gray scale micrographs showing sample FISH dot detection results.

The main limitation with the above single-level approach is dealing with varying (non-uniform) contrast within the image. In that case, using a large h value (high level) may result in detecting very bright spots only. Less bright (or dimmer) dots in low contrast regions can only be detected if a very small h value (low level) is used. However, that may increase the possibility of detecting false positives in high-contrast image regions. An illustrating example is shown in FIG. 4, where two regions of interests (ROI 1 and ROI 2) were extracted from the same image and processed using three h values. Clearly, a higher h value (low sensitivity) produced better detection results for the first ROI, but a lower h value (high sensitivity) produced better detection results for the second (low contrast) ROI. This motivated us to develop a multi-level approach.

In our multi-level approach, the image is processed using three h levels ($h_0$: high sensitivity, $h_1$: mid sensitivity and $h_1$: low sensitivity). Then, the best sensitivity level is selected for each cell independently from the other cells. Accepting or rejecting a level j for a cell i is done by computing a contrast score (equation 6a):

$$R_i^j = \frac{|P_i|}{|C_i|} \quad (6a)$$

where $0 \le R_i^j \le 1$, |.| represents the cardinality of the set (i.e. number of elements), $C_i$ is the set of all pixels i of the $i^{th}$ cell, and $P_i$ is the set of pixels in the $i^{th}$ cell with intensity values greater than a specific threshold The contrast score for a given cell represents the ratio of pixels within that cell that are greater than a threshold. The threshold is computed using intensity statistics of the cell background (non-FISH) pixels. Mathematically, $P_i$ is defined as follows (equation 7)

$$P_i = \{\forall p \in C_i : I(p) > \mu_i^j + 2\sigma_i^j\} \quad (7)$$

where I(p) is the intensity value at pixel I(p), $\mu_i^j$ and $\sigma_i^j$ are the intensity mean and standard deviation of the background (non-FISH) pixels inside the $i^{th}$ cell at level j.

We define two thresholds: the acceptance threshold $T_1$ (set to 0.6) and the high-detection threshold $T_2$ (set to 0.9). Then, a rule-based approach is used to automatically select the best level for each cell as described in Algorithm 1 as shown in FIG. 5.

The three h levels need to be defined prior to applying the above approach. Therefore, we developed a simple method to automatically estimate those levels. This method proceeds in 3 steps:

I. Extract local maxima ($M_x$) and minima ($M_n$) sets inside the nuclei and sort them based on their intensity values $$M_x \xrightarrow{descend_{sort}} \overrightarrow{M_x}$$
$$M_n \xrightarrow{ascend_{sort}} \overleftarrow{M_n}$$

II. Compute background level (equation 8):

$$B_g = \frac{\sum \overleftarrow{M_n}^{10\%}}{|\overleftarrow{M_n}^{10\%}|} \quad (8)$$

III. Compute three h levels (equation 9):

$$h_i = \frac{\sum \overrightarrow{M_x}^{(i-1) \times 5\%}}{|\overrightarrow{M_x}^{(i-1) \times 5\%}|} - B_g, \quad i = \{0, 1, 2\} \quad (9)$$

where $\overleftarrow{M_n}^{y\%}$ and $\overrightarrow{M_x}^{y\%}$ are the lowest and top y % of $\overleftarrow{M_n}$ and $\overrightarrow{M_x}$ respectively, and |.| is the cardinality of a set In certain embodiments, the processor may also be capable of automating one or more the steps and be configured to allow for the data analysis. The processor may also comprise a machine readable medium comprising instruction which when executed by a controller causes a multiplexing device to perform the method of analysis as described.

EXPERIMENTAL

In one example 19 slides were processed, each containing a number of tissue samples of breast carcinoma (ranging from 12 to 24 spots per slide), with a total of more than 300 spots/images. In order to quantitatively assess the performance of our proposed FISH dot counting algorithm, automatic counting results were compared to manual counts of 880 cells selected from 167 spots/image, from the 19 slides. Manual counting was performed by an expert who investigated the images using an image visualization tool that allows zooming in/out, navigating the 3-D stack and viewing multiple channels simultaneously with the ability to selectively turn on/off channels. Two metrics were defined to assess cell-level dot counting accuracy. The first metric (Type A error) is cell classification agreement. Two classes were defined: normal and cancerous. A normal cell (non-cancerous) was defined as having 3 or less HER2 and CEP17 dots. A cell is classified as cancerous otherwise. The second metric (Type B error) is dot-counting match, where a difference of more than 20% in absolute counts was considered an error. For instance, if 10 dots were found manually, then automatic counting in the range 8-12 dots is not considered a type B error.

The results of such a FISH counting is shown in FIG. 6 whereby the images illustrate the final FISH counting steps. In FIG. 6, image (A) is a micrograph of a close-up of a cell from Her2 FISH image with the cell contour superimposed. Micrograph (B) is an outcome of top-hat filtering. Micrograph (C) illustrates FISH (foreground) detection while (D) illustrates the detected local maxima points. Micrograph (E) is the result of initial dot separation whereby 8 out of 9 dots are detected. Micrograph (F) shows the final counting using size-based constraints results with 9 dots.

The algorithm yielded a cell-by-cell classification agreement of 88% (Type A) and exactly the same rate (88%) for the dot-counting match (Type B). When combining (taking the union of) classification agreement errors and counting match errors, the overall accuracy is 81% (165 errors). Table 1 shows a summary of counting results with percentages of error types for both normal and tumor tissues. Higher values indicate larger errors. When measuring using Type A or Type B errors separately, both yield overall error rates around 12%. If both are enforced, the error rate increases to 19%, indicating that they measure different errors.

FIG. 7 shows galleries of segmented nuclei with their detected dots superimposed. For each cell we show the composite image, HER2 and CEP17 channels and a table comparing automatic and manual dot counts. To further study the accuracy of our algorithm, we inspected the counting errors and found that 35 out of the 165 errors resulted from nuclei segmentation errors. Excluding those cells, our algorithm resulted in an overall accuracy of 84.6%. Our algorithm does not include any computationally expensive steps, which makes it efficient and fast. On average, it takes 30 seconds to process a 2048×2048 image/stack of 12 slices using a desktop with a 2.67 Core i7 processor and 4 GB of memory.

TABLE 1

Summary of counting error rates using 880 annotated cells taken from 19 cases (from 3 different batches).

| Type | Batch 1 | Batch 2 | Batch 3 | All |
|---|---|---|---|---|
| A | 12% (46/376) | 12% (44/364) | 11% (15/140) | 12% (105/880) |
| Tumor | 14% (30/216) | 19% (39/210) | 16% (6/37) | 16% (75/463) |
| Normal | 10% (16/160) | 3% (5/154) | 9% (9/130) | 7% (30/417) |
| B | 13% (47/376) | 13% (47/364) | 6% (8/140) | 12% (102/880) |
| Tumor | 20% (43/216) | 20% (43/210) | 8% (3/37) | 19% (89/463) |
| Normal | 3% (4/160) | 3% (4/154) | 5% (5/130) | 3% (13/417) |
| A or B | 22% (82/376) | 17% (63/364) | 14% (20/140) | 19% (165/880) |
| Tumor | 29% (62/215) | 28% (58/210) | 22% (8/37) | 28% (128/463) |
| Normal | 13% (20/160) | 3% (5/154) | 12% (12/103) | 9% (37/417) |

It should be understood that the method described may enable the location and identification of cell types whose presence in a given tissue sample may be an indication of cancer and/or predictive of a patient outcome. A cell type which is found to be important can then be interrogated by visualizing its biomarker signature and a random selection of its members via cell stack montages. The results can also be used for generating hypotheses about the mechanism of disease progression.

In certain embodiments, the method of analysis described may also be used in research for predictive outcomes such as determining effectiveness of drug therapy, analyzing molecular pathway of a drug, or possible cause and effect of environmental exposure or other possible cancer causing agents. As such the methods may have research, predictive, or therapeutic uses.

The invention claimed is:

1. A computer implemented method of cell-level FISH dot counting of a biological sample, the computer including a processor, the method comprising:
   a. receiving by the processor a first image of a biological sample stained with a nuclear counterstain
   b. transforming by the processor the image into a nuclear counterstain mask by segmenting the nuclei of the biological sample based on intensity of the signal from the nuclear counterstain;
   c. receiving by the processor a second image of a biological sample stained with an hybridized in situ fluorescent probe (FISH probe);
   d. applying by the processor a multi-level extended h-maxima or h-minima to the image to extract a FISH binary mask; wherein the best h level for each cell (i) is selected by the processor using a rule-based approach, the rule-based approach comprising computing by the processor a contrast score $R_i^j$ used to accept or reject a level such that:

$$R_i^j = \frac{|P_i|}{|C_i|},$$

$0 \leq R_{ij} \leq 1$ where;
   $|P_i|$ represents the cardinality of the set;
   $C_i$ the set of all pixels in the ith cell;
   $P_i = \{\forall p \in C_i : I_p > \mu_{ij} + 2\sigma_{ij}\}$; and
   $\mu_{ij}$ and $\sigma_{ij}$ are the intensity mean and standard deviation of the background (non-FISH) pixels inside the ith cell at level j;
   e. aligning and overlaying the nuclear counterstain mask and FISH binary mask by the processor according to the signals detected; and
   f. optionally counting by the processor the number of FISH dots inside each nucleus using local maxima and size constraints.

2. The method of claim 1 wherein the nuclear counterstain is 4',6-diamidino-2-phenylindole (DAPI).

3. The method in claim 1 wherein the rule-based method comprises comparing the contrast score to an acceptance and a high-detection threshold.

4. The method of claim 1 wherein the first image of the biological sample stained with the nuclear counterstain represents a series of images taken at 3 or more focal depths through said biological sample and wherein segmenting the nuclei of the biological sample comprises:
   computing by the processor a Brenner gradient value of each of the images;
   selecting the best in-focus image based on the Brenner gradient values; and
   applying by the processor a wavelet-based segmentation algorithm to the images to decompose the images into wavelet coefficients at multiple scales.

5. The method of claim 1 wherein the second image of the biological sample stained with an hybridized in situ fluorescent probe represents a series of images taken at 3 or more focal depths through said biological sample.

6. The method of claim 5 wherein the series of images are enhanced by the processor by:
   computing by the processor a Brenner gradient value of each of the images;
   and selecting the best in-focus image using the Brenner gradient values;

denoising by the processor the image using median filtration to reduce the noise in of said images; and performing background subtraction by the processor of the image using top-hat filtering to enhance the contrast of said images.

7. The method of claim 1 wherein counting the individual FISH dots further comprises separating clustered FISH dots by the processor into separate FISH dots and classifying resulting objects as individual FISH dots.

8. The method of claim 7 wherein counting the FISH dots by the processor comprises:
detecting a local maxima within the detected FISH mask;
applying a seeded watershed algorithm to separate touching dots; and
optionally applying an area-based approach to further divide remaining large objects based on a predefined maximum area.

9. A non-transitory computer-readable medium having stored thereon computer-executable instructions that when executed by a computer cause the computer to:
a. receive a first image of a biological sample stained with a nuclear counterstain;
b. transform the image into nuclear counterstain mask by segmenting the nuclei of the biological sample based on intensity of the signal from the nuclear counterstain;
c. receive a second image of a biological sample stained with an hybridized in situ fluorescent probe (FISH probe);
d. apply a multi-level extended h-maxima or h-minima to the image to extract a FISH binary mask wherein the best h level for each cell (i) is selected by the processor using a rule-based approach, the rule-based approach comprising computing by the processor a contrast score $R_i^j$ used to accept or reject a level such that:

$$R_i^j = \frac{|P_i|}{|C_i|},$$

$0 \leq Rij \leq 1$ where;
$|P_i|$ represents the cardinality of the set;
Ci the set of all pixels in the ith cell;
Pi={$\forall p \in Ci : Ip > \mu ij + 2\sigma ij$}; and
μij and σij are the intensity mean and standard deviation of the background (non-FISH) pixels inside the ith cell at level j;
e. align and overlay the nuclear counterstain mask and FISH binary mask according to the signals detected; and
f. optionally count the number of FISH dots inside each nucleus using local maxima and size constraints.

10. The computer-readable medium of claim 9 wherein the nuclear counters stain is 4',6-diamidino-2-phenylindole (DAPI).

11. The computer-readable medium of claim 9 wherein the rule-based method comprises comparing the contrast score to an acceptance and a high-detection threshold.

12. The computer-readable medium of claim 9 wherein the first image of the biological sample stained with the nuclear counterstain represents a series of images taken at, at least three focal depths through said biological sample and further comprising computer-executable instructions that when executed by the computer cause the computer to:
compute the Brenner gradient value of each of the images;
select the best in-focus image using the Brenner gradient values; and apply a wavelet-based segmentation algorithm to the images to decompose the images into wavelet coefficients at multiple scales.

13. The computer-readable medium of claim 9 wherein the second image of the biological sample stained with a hybridized in situ fluorescent probe represents a series of images taken at 3 or more focal depths through said biological sample.

14. The computer-readable medium of claim 13 comprising computer-executable instructions that when executed by the computer cause the computer to:
compute a Brenner gradient value of each of the images;
select the best in-focus image using the Brenner gradient values;
denoise the images using median filtration to reduce the noise of said images; and
subtract the image background using top-hat filtering to enhance the contrast of said images.

15. The computer-readable medium of claim 9 further comprising computer-executable instructions that when executed by the computer cause the computer to separate clustered FISH dots into separate objects, and to classify the resulting objects as individual FISH dots.

16. The computer-readable medium of claim 15 wherein counting the FISH dots comprises instructions to:
detect a local maxima within the detected FISH binary mask;
apply a seeded watershed algorithm to separate touching dots; and
optionally apply an area-based approach to further divide remaining large objects based on a predefined maximum area.

17. A system for cell-level FISH dot counting, the system comprising:
a processor;
an input coupled to the processor and configured to receive the image data; and
a memory coupled to the processor, the memory including computer-executable instructions that when executed by the processor cause the processor to:
a. receive a first image of a biological sample stained with nuclear counterstain
b. transform the image into a nuclear counterstain mask by segmenting the nuclei of the biological sample based on intensity of the signal from the nuclear counterstain;
c. receive a second image the biological sample stained with an hybridized in situ fluorescent probe (FISH probe);
d. apply a multi-level extended h-maxima or h-minima to the image to extract a FISH binary mask; wherein the best h level for each cell (i) is selected by the processor using rule-based approach, the rule-based approach comprising computing by the processor a contrast score $R_i^j$ used to accept or reject a level such that:

$$R_i^j = \frac{|P_i|}{|C_i|},$$

$0 \leq Rij \leq 1$ where;
$|P_i|$ represents the cardinality of the set;
Ci the set of all pixels in the ith cell;
Pi={$\forall p \in Ci : Ip > \mu ij + 2\sigma ij$}; and μij and σij are the intensity mean and standard deviation of the background (non-FISH) pixels inside the ith cell at level j;
e. align and overlay the nuclear counterstain mask and FISH binary mask according to the signals detected; and
f. optionally count the number of FISH dots inside each nucleus using local maxima and size constraints.

18. The system of claim 17 wherein the nuclear counterstain is 4',6-diamidino-2-phenylindole (DAPI).

19. The system of claim 17 wherein the rule-based method comprises comparing the contrast score to an acceptance and a high-detection thresholds.

20. The system of claim 17 wherein the first image of the biological sample stained with the DAPI—represents a series of images taken at 3 or more focal depths through said biological sample and the computer-executable instructions that when executed by the processor cause the processor to:
compute a Brenner gradient value of each of the images;
select the best in-focus image using the Brenner gradient values; and
apply a wavelet-based segmentation algorithm to the images to decompose the images into wavelet coefficients at multiple scales.

21. The system of claim 17 wherein the second image of the biological sample stained with a hybridized in situ fluorescent probe represents a series of images taken at 3 or more focal depths through said biological sample.

22. The system of claim 17 comprising computer-executable instructions that when executed by the processor cause the processor to:
compute the Brenner gradient value of each of the images;
select the best in-focus image using the Brenner gradient values;
denoise the images using median filtration to reduce the noise of said images; and
subtract the image background using top-hat filtering to enhance the contrast of said images.

23. The system of claim of claim 17 further comprising computer-executable instructions that when executed by the processor cause the processor to separate clustered FISH dots into separate objects, and to classify the resulting objects as individual FISH dots.

24. The system of claim 23 wherein instructions to count the FISH dots comprise computer-executable instructions that when executed by the processor cause the processor to:
detect a local maxima within the detected FISH binary mask;
apply a seeded watershed algorithm to separate touching dots; and
optionally apply an area-based approach to further divide remaining large objects based on a predefined maximum area.

* * * * *